(12) United States Patent
Yang

(10) Patent No.: US 7,374,224 B2
(45) Date of Patent: May 20, 2008

(54) CRASH PAD FOR INSTRUMENT PANEL

(75) Inventor: Ho-jun Yang, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 63 days.

(21) Appl. No.: 11/132,202

(22) Filed: May 19, 2005

(65) Prior Publication Data

US 2005/0275238 A1  Dec. 15, 2005

(30) Foreign Application Priority Data

Jun. 11, 2004  (KR) .................. 10-2004-0043191

(51) Int. Cl.
*B62D 25/14* (2006.01)
(52) U.S. Cl. .......................... 296/70; 180/90
(58) Field of Classification Search .................. 296/70, 296/187.03, 187.05; 280/751, 752; 180/90
See application file for complete search history.

(56) References Cited

U.S. PATENT DOCUMENTS

| | | | |
|---|---|---|---|
| 6,464,280 B1* | 10/2002 | Shibata et al. ................. | 296/70 |
| 6,517,145 B2* | 2/2003 | Hedderly ..................... | 296/192 |
| 6,854,783 B2* | 2/2005 | Teranishi et al. ............. | 296/70 |
| 6,869,123 B2* | 3/2005 | Marks et al. ................. | 296/70 |
| 2004/0256878 A1* | 12/2004 | Rave et al. .................... | 296/70 |
| 2005/0183897 A1* | 8/2005 | DePue ......................... | 180/90 |

FOREIGN PATENT DOCUMENTS

| | | |
|---|---|---|
| JP | 2000-313249 | 11/2000 |
| JP | 2002-12062 | 1/2002 |
| KR | 2002-40056 | 5/2002 |

OTHER PUBLICATIONS

English language Abstracts of JP 2002-12062.
English language Abstract of JP 2000-313249.
English language Abstract of Korean 2002-40056.

* cited by examiner

*Primary Examiner*—Dennis H. Pedder
*Assistant Examiner*—Melissa Black
(74) *Attorney, Agent, or Firm*—Greenblum & Bernstein, P.L.C.

(57) ABSTRACT

A crash pad for an instrument panel includes a crash pad skin forming an external surface of the instrument panel and positioned on the upper part of a gauge board of a vehicle, a crash pad core attached to the lower surface of the crash pad skin, the crash pad core configured to withstand impact, and a lower frame forming an impact absorbing space that attenuates impact transmitted to the crash pad core, the lower frame attached to the lower surface of the crash pad core and fixed to a cluster facia.

3 Claims, 3 Drawing Sheets

CRASH PAD FOR INSTRUMENT PANEL

RELATED APPLICATIONS

The present disclosure relates to subject matter contained in Korean Application No. 10-2004-43191, filed on Jun. 11, 2004, which is herein expressly incorporated by reference its entirety.

BACKGROUND OF THE INVENTION

1. Field of the Invention

The present invention relates to a crash pad for an instrument panel, and more particularly to a main crash pad for an instrument panel, which comprises a crash pad core including an acrylonitrille butadiene styrene (ABS) panel and a polycarbonate (PC) panel, and a lower frame made of polypropylene fumarate (PPF) of urethane series and attached to the lower surface of the crash pad core, thereby improving impact resistance.

2. Description of the Related Art

Generally, an instrument panel is a molded product made of synthetic resin and installed on an upper part of a center facia, in which an audio system or an air conditioning unit is installed. A front part of a driver's seat, in which a gauge board is installed, is made from a crash pad made of a rigid compound material so that the front part can withstand impact and protect a driver from impact when a vehicle collides with an object.

A crash panel is a molded structure made of plastic, and comprises a main crash pad installed for maintaining the shape of the crash panel, a urethane foam member positioned on the outer surface of the main crash pad, and a skin member attached on the outer surface of the urethane foam member.

FIG. 1 is a cross-sectional view illustrating installation of a conventional crash pad for vehicles.

A conventional instrument panel (A) comprises a main crash pad 2 positioned on the upper part of a gauge board-receiving portion 10 and formed by plastic injection molding for maintaining the shape thereof, a urethane foam 4 covering the external surface of the main crash pad 2 and serving as a cushion, and a skin 6 having a small thickness and covering the external surface of the urethane foam 4.

A protruded portion 8 for intercepting a gauge board installed on the gauge board-receiving portion 10 is formed on the main crash pad 2.

In order to increase impact resistance and absorb impact, the above conventional main crash pad has a large thickness and includes the urethane foam therein, thereby having a heavy weight and increasing production costs.

SUMMARY OF THE INVENTION

Therefore, the present invention has been made in view of the above problems, and it is an object of the present invention to provide a crash pad, for an instrument panel, which has a structure with a reduced weight, thereby reducing production costs while increasing impact resistance.

In accordance with the present invention, the above and other objects can be accomplished by the provision of a crash pad for an instrument panel, comprising: a crash pad skin forming an external surface of the instrument panel and positioned on the upper part of a gauge board of a vehicle; a crash pad core attached to the lower surface of the crash pad skin so as to withstand impact; and a lower frame forming an impact absorbing space for attenuating impact transmitted to the crash pad core, and attached to the lower surface of the crash pad core and fixed to a cluster facia.

Preferably, the crash pad core may include an acrylonitrille butadiene styrene (ABS) panel containing three components including acrylonitrille, butadiene and styrene for withstanding impact; and a polycarbonate (PC) panel attached to the lower surface of the ABS panel, and provided with a connection hole for bonding the lower frame to the PC panel therethrough and a protrusion formed at the front part thereof.

Further, preferably, the lower frame may include a polypropylene fumarate (PPF) frame forming a space, bonded to the PC panel by inserting a screw into the connection hole of the PC panel of the crash pad core, and provided with a hole, for receiving the protrusion of the PC panel, formed through a front surface thereof.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the annexed drawings.

Figure 1:
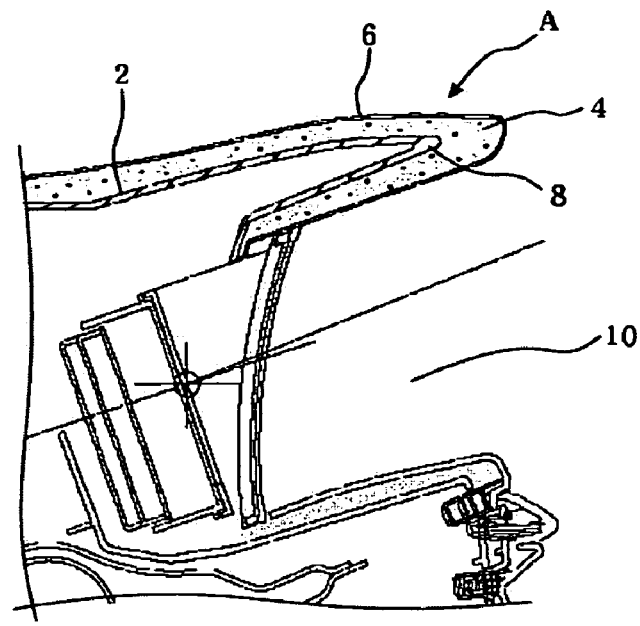
FIG. 1 is a cross-sectional view illustrating installation of a conventional main crash pad for vehicles.
Figure 2:
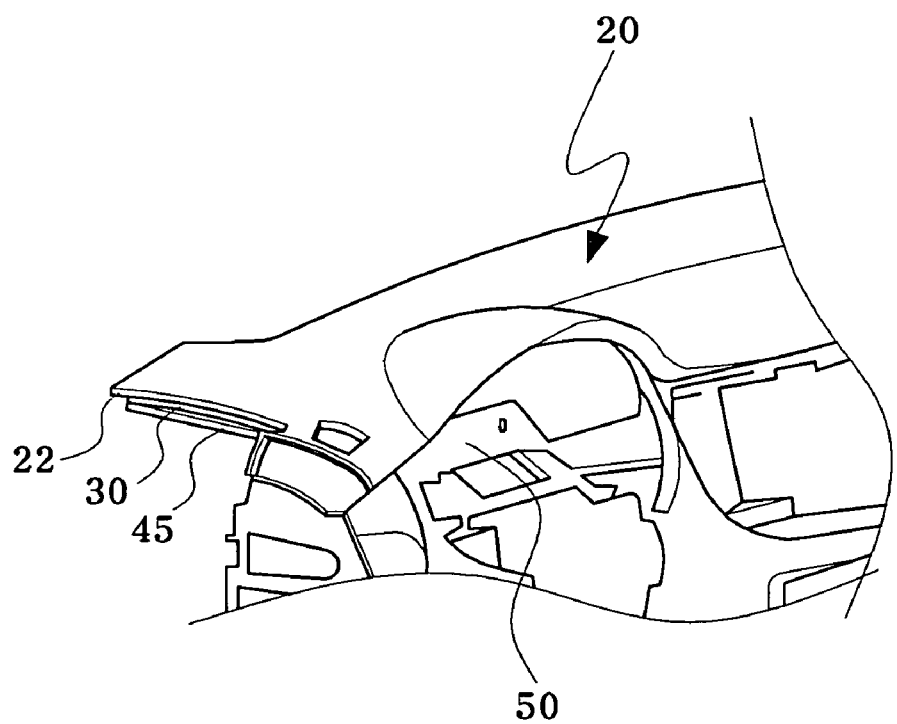
FIG. 2 is a perspective view of a crash pad for an instrument panel in accordance with the present invention.
Figure 3:
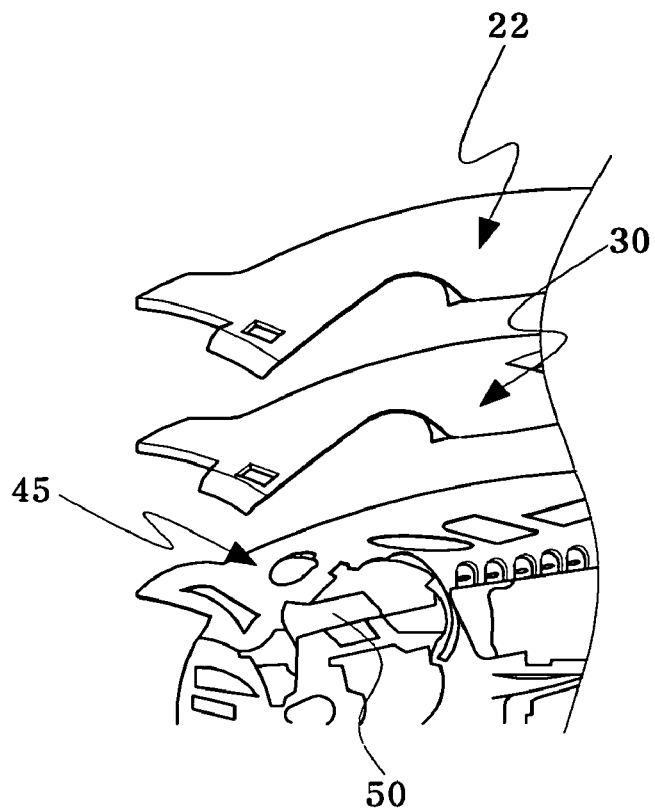
FIG. 3 is an exploded perspective view of the crash pad in accordance with the present invention.
Figure 4:
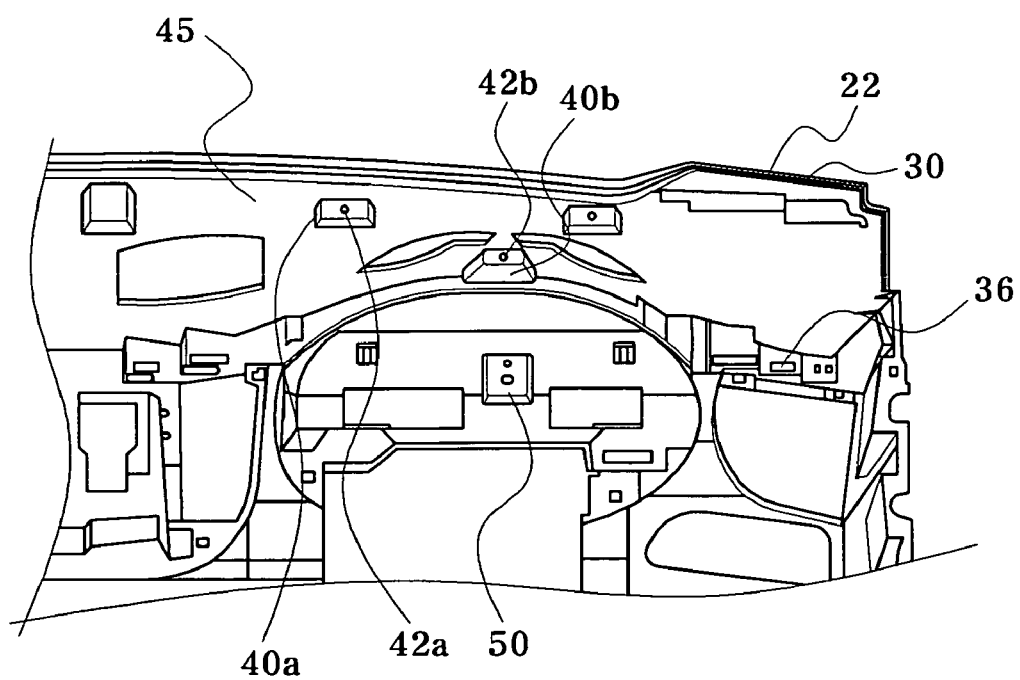
FIG. 4 is a perspective view of a rear part of the crash pad in accordance with the present invention.
Figure 5:
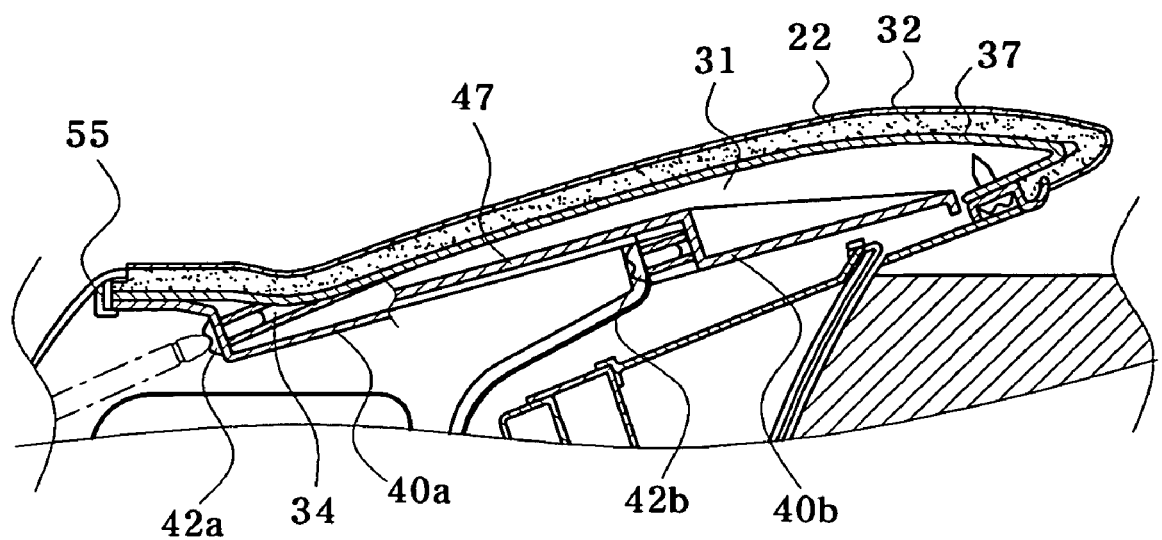
FIG. 5 is a cross-sectional view of the crash pad in accordance with the present invention.
Figure 6:
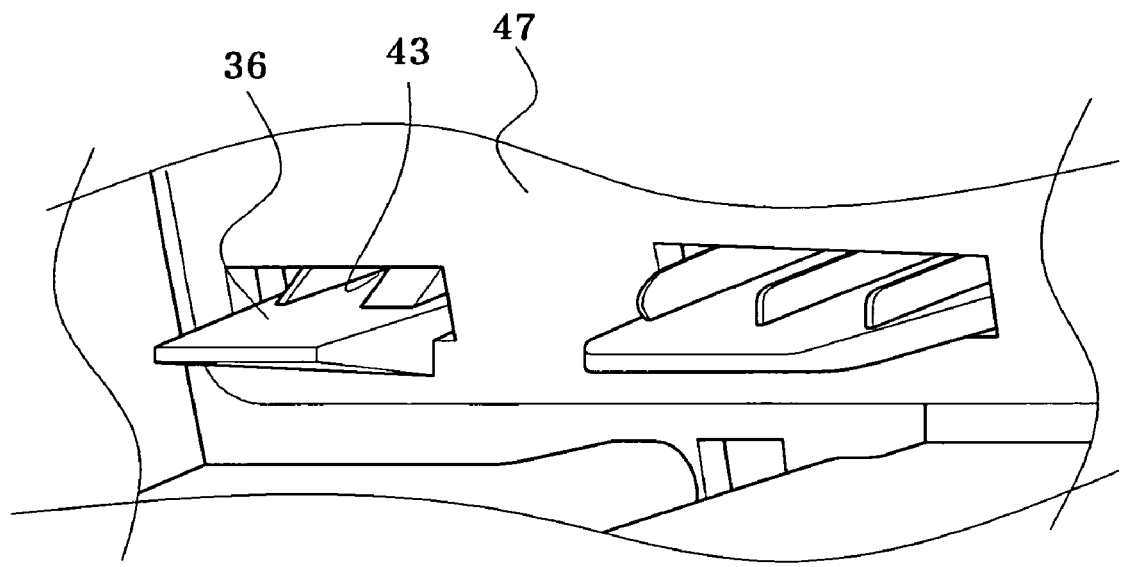
FIG. 6 is a perspective view illustrating a part of a polypropylene frame of the crash pad, which is bonded to a polycarbonate panel.

FIG. 1 is a cross-sectional view illustrating installation of a conventional main crash pad for vehicles. FIG. 2 is a perspective view of a crash pad for an instrument panel in accordance with the present invention. FIG. 3 is an exploded perspective view of the crash pad in accordance with the present invention FIG. 4 is a perspective view of a rear part of the crash pad in accordance with the present invention. FIG. 5 is a cross-sectional view of the crash pad in accordance with the present invention. FIG. 6 is a perspective view illustrating a part of a polypropylene frame of the crash pad, which is bonded to a polycarbonate panel.

A crash pad for an instrument panel in accordance with the present invention comprises a crash pad skin 22 forming the external surface of the instrument panel positioned on the upper surface of a gauge board of a vehicle, a crash pad core 30 attached to the lower surface of the crash pad skin 22 so as to withstand impact, and a lower frame 45 forming an impact absorbing space 31 for attenuating impact transmitted to the crash pad core 30, and attached to the lower surface of the crash pad core 30 and fixed to a cluster facia 50.

Here, the gauge board is installed on the cluster facia 50, and the cluster facia 50 is attached to the lower frame 45 by a screw 42b.

The crash pad core 30 includes an acrylonitrille butadiene styrene (ABS) panel 32 containing three components, such as acrylonitrille, butadiene and styrene, for withstanding impact, and a polycarbonate (PC) panel 37 attached to the lower surface of the ABS panel 32 and provided with a connection hole 34 for bonding the lower frame 45 to the PC panel 37 therethrough and a protrusion 36 formed at the front part thereof.

The lower frame 45 includes a polypropylene fumarate (PPF) frame 47 forming a space, bonded to the PC panel 37 by inserting a screw 42a into the connection hole 34 of the PC panel 37 of the crash pad core 30, and provided with a hole 43, for receiving the protrusion 36 of the PC panel 37, formed through a front surface thereof.

That is, a screw unit 40a including a through hole, through which the screw 42a passes to be inserted into the connection hole 34 of the PPF frame 47, is formed on the rear part of the PPF frame 47 of the lower frame 45.

A front panel 40b of the PPF frame 47 of the lower frame 45 is bent, thus forming the impact-absorbing space 31 between the front panel 40b and the PC panel 37 of the crash pad core 30.

The impact-absorbing space 31 serves to attenuate impact transmitted from the outside through the ABS panel 32, and has a cylindrical structure for improving the rigidity of the crash pad 20.

Further, the lower frame 45 is attached to the rear part of the crash pad core 30 through a stationary plate 55.

As apparent from the above description, the present invention provides a crash pad for an instrument panel, which has a structure with a reduced weight, thereby reducing production costs while increasing impact resistance.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A crash pad for an instrument panel, comprising:
   a crash pad skin forming an external surface of the instrument panel and positioned on an upper part of a gauge board of a vehicle;
   a crash pad core attached to a lower surface of the crash pad skin, the crash pad core configured to withstand impact; and
   a lower frame forming an impact absorbing space that attenuates impact transmitted to the crash pad core, the lower frame attached to a lower surface of the crash pad core and fixed to a cluster facia,
   wherein the crash pad core comprises a polycarbonate (PC) panel attached to a lower surface of an acrylonitrile butadiene styrene (ABS) panel,
   the lower frame comprises a polypropylene fumarate (PPF) frame having a front panel which is bent and forms the impact absorbing space between the front panel and the polycarbonate (PC) panel of the crash pad core, and
   an end of the front panel of the polypropylene fumarate (PPF) frame is screwed to the gauge board.

2. The crash pad as set forth in claim 1, wherein:
   the acrylonitrile butadiene styrene (ABS) panel contains three components including acrylonitrile, butadiene and styrene to withstand impact; and
   the polycarbonate (PC) panel is provided with a connection hole to connect the lower frame to the polycarbonate (PC) panel therethrough and a protrusion formed at a front part thereof.

3. The crash pad as set forth in claim 1, wherein the lower frame is provided with a hole formed through a front surface thereof, the lower frame being connectable to the polycarbonate (PC) panel by inserting a screw into a connection hole of the polycarbonate (PC) panel of the crash pad core, and by receiving a protrusion of the polycarbonate (PC) panel.

* * * * *